Dec. 14, 1937.  G. CROMPTON, JR., ET AL  2,102,517
GRINDING MACHINE
Filed Jan. 23, 1936   7 Sheets-Sheet 1

Inventors
GEORGE CROMPTON, JR.
CLARENCE J. GREEN
By George Crompton Jr.
Attorney

Fig.10

Dec. 14, 1937.  G. CROMPTON, JR., ET AL  2,102,517
GRINDING MACHINE
Filed Jan. 23, 1936    7 Sheets-Sheet 5

Dec. 14, 1937.  G. CROMPTON, JR., ET AL  2,102,517
GRINDING MACHINE
Filed Jan. 23, 1936  7 Sheets-Sheet 6

Fig. 12

Inventors
GEORGE CROMPTON, JR.
CLARENCE J. GREEN
By George Crompton Jr.
Attorney Dec. 14, 1937.  G. CROMPTON, JR., ET AL  2,102,517
GRINDING MACHINE
Filed Jan. 23, 1936  7 Sheets-Sheet 7

Inventors
GEORGE CROMPTON, JR.
CLARENCE J. GREEN
By George Crompton Jr.
Attorney Patented Dec. 14, 1937

2,102,517

UNITED STATES PATENT OFFICE 2,102,517

GRINDING MACHINE

George Crompton, Jr., Flushing, N. Y., and Clarence J. Green, Worcester, Mass., assignors to Norton Company, Worcester, Mass., a corporation of Massachusetts Application January 23, 1936, Serial No. 60,479

18 Claims. (Cl. 51—165)

The invention relates to grinding machines and with regard to its more specific features to a work calipering mechanism therefor.

One object of the invention is to provide a calipering mechanism which can readily be maintained at a given adjustment and is highly accurate. One object of the invention is to provide a sensitive calipering mechanism. Another object of the invention is to provide a calipering mechanism adapted to give excellent results in actual practical operation. Another object of the invention is to provide a contact calipering mechanism the contact of which shall not mar the surface of a work piece. Another object of the invention is to provide a contact calipering device having smooth contact surfaces. Another object of the invention is to provide a combined caliper and steadyrest. Other objects will be in part obvious or in part pointed out hereinafter.

The invention accordingly consists in the features of construction, combinations of elements and arrangements of parts, as will be exemplified in the structure to be hereinafter described, and the scope of the application of which will be indicated in the following claims.

In the accompanying drawings, in which is shown one of various possible embodiments of the mechanical features of this invention.

Figures 1, 2:
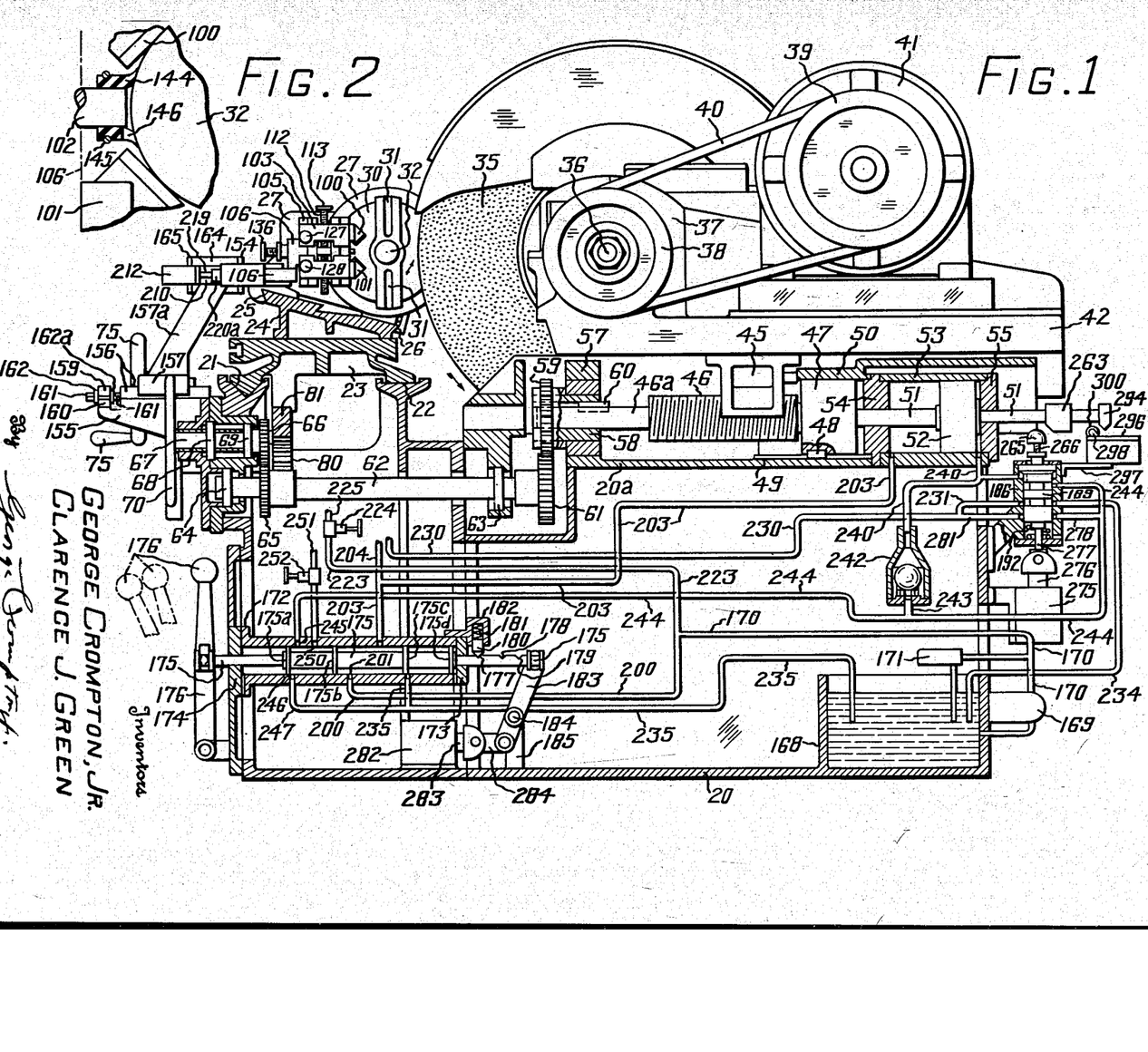
Fig. 1 is a vertical sectional view of a grinding machine constructed in accordance with the invention.
Fig. 2 is an enlarged fragmentary view of the calipering device shown in contact with the work piece.

Referring first to Fig. 1, the invention may be embodied in many different types of grinding machines, but so far as certain features thereof are concerned it is embodied in any type of grinding machine for the grinding of convex cylindrical surfaces. So far as certain features of the invention are concerned it may be embodied in a center cylindrical grinding machine adapted to grind by the so-called "plunge-cut" method, and the specific embodiment will be so described. By "plunge-cut" we mean grinding in which the wheel and the work piece move relatively to each other by a substantially continuous motion without a wide relative traverse between the wheel and work, although a limited reciprocation or traverse may be employed in order to eliminate or reduce grinding lines. In such a machine, increments of transverse or cutting feed are usually not allocated to any particular phase of the reciprocating or traverse motion, if any.

Figures 7, 9:
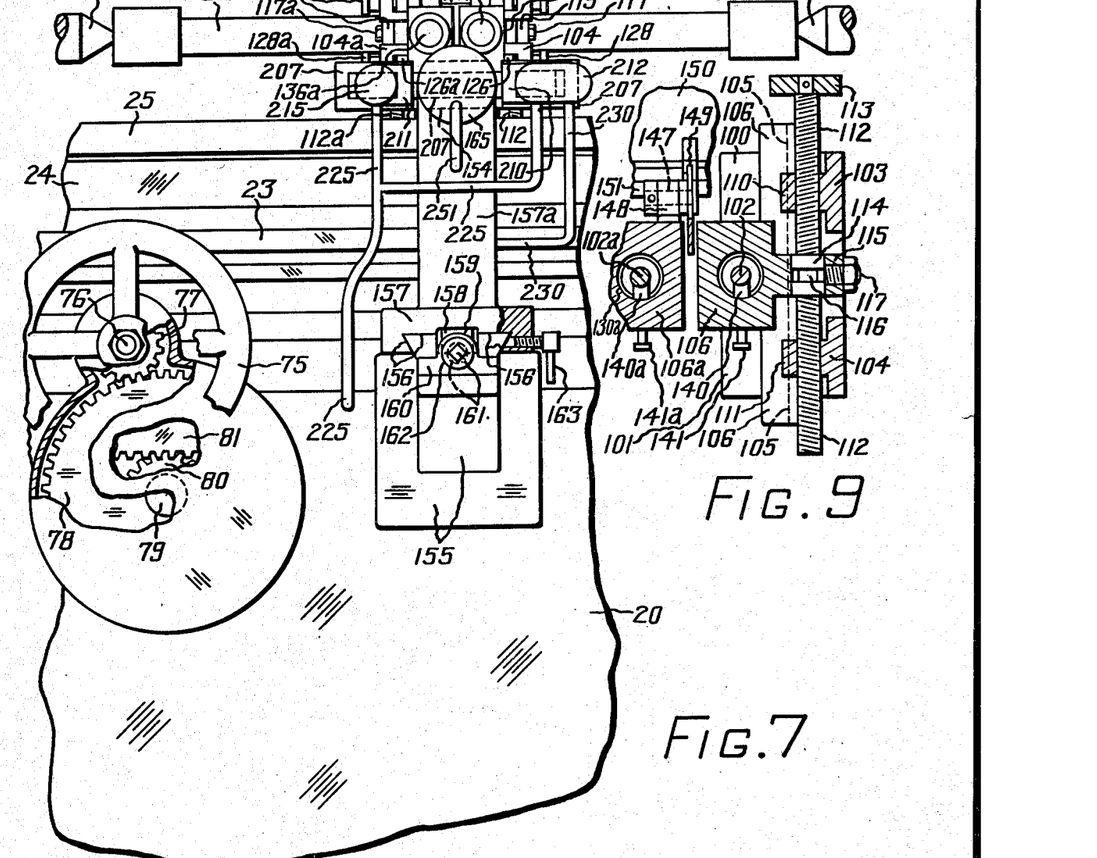
Fig. 7 is a fragmentary front elevation of the front of the machine showing the calipering apparatus.
Fig. 9 is a vertical sectional view taken on the line 9—9 of Fig. 3.

Referring now to Fig. 1, we provide a machine base 20 of any desired structure on the front part of which may be ways 21 and 22 for the support of a work carriage 23. Adjustably fastened to the carriage 23 is a work table 24 having ways 25 and 26 for the support of a headstock 27 and a tailstock, not shown. The headstock 27 has, as shown in Fig. 7, a center 28, and the tailstock has a center 29; the center 28 is mounted in a work driving spindle upon one end of which is a driving plate 30 having slots 31 to receive the usual work driving dog. The spindle, not shown, may be driven by a belt and pulley or a motor or in any other desired manner. It will be appreciated that the foregoing represents the usual elements in a plain cylindrical grinding machine and any variations or changes may be made therein within the scope of this invention, and any other means for holding and rotating a work piece 32 may be employed, for example a work gripping chuck might be used. The apparatus shown is capable of supporting long work pieces and is capable of adjustment for different sizes of work pieces in so much as the heatstock 21 and the tailstock, not shown, may be moved along the table 24 to any desired position and there securely clamped in place.

Still referring to Fig. 1, we provide a grinding wheel 35. This wheel 35 may be mounted upon a spindle 36 which is journaled in bearings, not shown, in a wheel head 37; to the spindle 36 is attached a pulley 38 connected to a pulley 39 by means of one or more belts 40, the pulley 39 being driven by a motor 41. Thus the grinding wheel 35 is driven at the desired peripheral velocity, and so far as this invention is concerned any type of wheel drive may be employed.

The wheel head 37 is mounted upon a feed slide 42 which is mounted upon ways, not shown, on the machine base 20, and which ways are formed to permit movement of the slide 42 perpendicular to the axis of the work piece 32. Still referring to Fig. 1, on the under side of the slide 42 is a half nut 45 which engages a feed screw 46 to which rectilinear movement may be given for advancing and retracting the grinding wheel automatically, and to which angular movement may be given for manually moving the grinding wheel and for compensating for wheel reduction due to normal wear or dressing or truing thereof. More specifically, and according to this particular embodiment of the invention, we may provide a slide block 47 to which one end of the feed screw 46 is connected by journals, not shown, the slide block 47 being keyed by means of a key and spline 48, 49 to a guide member 50 provided in the machine frame, and the slide block 47 being connected by means of a piston rod 51 to a piston 52 in a fluid pressure cylinder 53 which is closed by cylinder heads 54 and 55. Movement of the piston 52 in the cylinder 53 carries the grinding wheel 35 toward and away from the work piece 32.

Considering now the mechanism for manually moving the slide 42, and still referring to Fig. 1, upstanding from a central horizontal frame member 20a is a journal 57 which journals a sleeve 58 to which is fastened a gear 59. An extension 46a of the screw shaft 46 is splined by means of a key 60 to the sleeve 58. The gear 59 meshes with a gear 61 which is fastened to the end of a shaft 62 that is mounted in suitable bearings 63 and 64 in the machine frame. Fastened to the shaft 62 is a gear 65 which meshes with a gear 66 fastened to a shaft 67 which is journaled in journals 68 and 69 in the machine frame. We provide a hand wheel 70 fastened to the shaft 67 for rotating the train of gearing described. Rotation of the hand wheel 70 procures rotation of the feed screw 46; and it is noted that the thrust on the feed screw is taken by the fluid in the cylinder 53. Fluid pressure actuation of the piston 52 procures translation of the nut 45 by translation of the feed screw 46, and the portion 46a may move in the sleeve 58.

Considering now the control of the carriage 23, we may provide any mechanism for this purpose such as mechanical power feed or hydraulic feed, but so far as certain features of the invention are concerned a manual adjusting apparatus may be used. Referring now to Figs. 1 and 7, we show a table positioning hand wheel 75 upon the shaft 76 of which is mounted a pinion gear 77 which meshes with a large gear 78 mounted on shaft 79 to which is fastened a pinion gear 80 meshing with a rack 81 fastened to the under side of the carriage 23. The carriage 23 and therefore the table 24 may be moved to any position at any time by rotation of the hand wheel 75.

Figures 3, 5, 6:
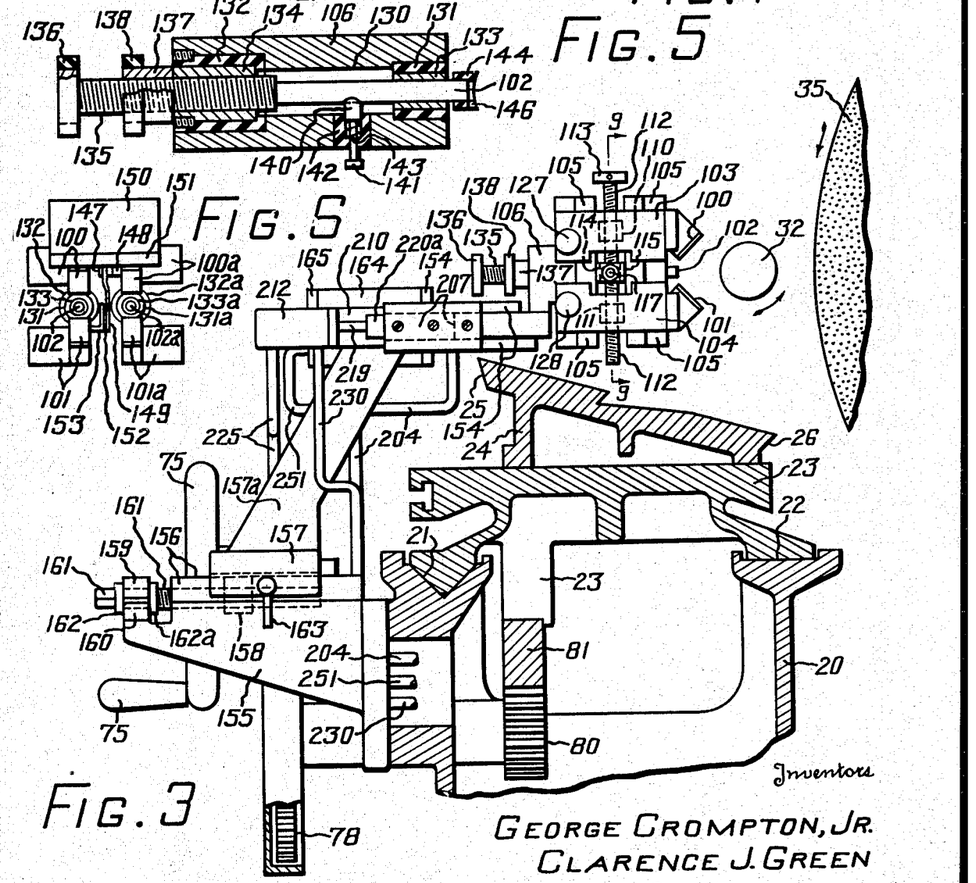
Fig. 3 is a view on an enlarged scale of a portion of the apparatus shown in Fig. 1, being a vertical sectional view through the table and associated parts and showing the calipering apparatus in side elevation.
Fig. 5 is a detail axial sectional view of the electrode calipering element and its mounting.
Fig. 6 is a view substantially on the scale of Fig. 4 of the calipering device, looking from the work piece toward the front of the machine.
Figure 4:
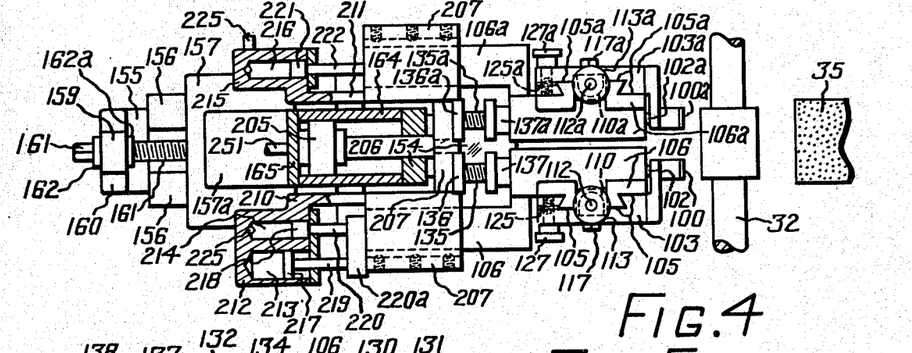
Fig. 4 is a plan view of the calipering device, certain hydraulic mechanisms being shown in section, and the scale being substantially that of Fig. 3.

So far as certain aspects of the invention are concerned the sizing mechanism may be applied to or combined with many other types of grinding machines, but it is particularly applicable in connection with and in combination with a grinding machine having some of the elements and features of that above described. Considering now the sizing apparatus which is more specifically the subject matter of the present invention, and referring first to Fig. 3, we provide upper and lower angle calipering plates 100 and 101 respectively which together with a central electrode calipering rod 102 constitute a Y-gauge or calipering device for setting into action certain instrumentalities when the work piece reaches a desired size. Referring now to Fig. 4, so far as certain features of the invention are concerned and to achieve the control hereinafter specified, we provide similar sets of the Y-gauging instrumentalities, there being a second upper angle calipering plate 100a, and as shown in Fig. 6 a second lower angle calipering plate 101a, and a second electrode calipering rod 102a. Figs. 4 and 6 show the relative position of these parts.

Referring now to Figs. 3 and 4, the upper plates 100 and 100a are respectively mounted on vertically slidable slide blocks 103 and 103a. Similarly the lower angle calipering plates 101 and 101a are respectively fastened to vertically slidable blocks 104 and 104a. Referring now to Figs. 3, 4 and 9, we provide vertical slideways 105 and 105a on opposite sides of central gauging supporting members 106 and 106a respectively; these slideways are dovetailed slideways cooperating with dovetailed portions of the respective slides 103, 104, 103a and 104a. The slideway 105 supports the slides 103 and 104 while the slideway 105a supports the slides 103a and 104a.

Referring now to Figs. 3 and 9, passing through nuts 110, 111 formed on the inside portions of the slides 103 and 104 respectively is a single adjusting screw shaft 112 having a knurled head 113. The upper portion of the screw shaft 112 has a right-hand screw thread, and the lower portion thereof has a left-hand screw thread, whereby turning of the knurled head 113 adjusts one slide upwardly and the other slide downwardly. Stating this in another way, clockwise rotation, Fig. 4, of the head 113 separates the slides 103 and 104, while counterclockwise rotation of the head 113 brings them together. The screw shaft 112 has a bearing portion 114 between the right-hand and left-hand threads which passes through a journal 115, and in the bearing 114 is a groove 116 in which fits the end of a stud 117 for accurate location of the screw shaft 112.

Referring now to Fig. 4, there is a knurled head 113a of a screw shaft 112a for similar adjustment of the slides 103a and 104a, and the construction, mounting and arrangement of the parts for the left-hand gauging instrumentalities is the same as that already described for the right-hand gauging instrumentalities. Once a desired position of adjustment of the angle calipering plates has been achieved for either gauge, the parts may be locked in position, for example by means of wedge clamps 125, 126 (Fig. 7), 125a and 126a operated by screw members 127, 128, 127a and 128a respectively.

Considering now either set of angle calipering plates, once they have been brought to adjusted position and clamped there they constitute a Y-gauge. As will be hereinafter described, we prefer to provide instrumentalities for the adjustment of the gauges in a vertical direction so that the bisector of the angle subtended by the gauge plates will pass through the axis of the work piece. Rather than depend upon an absolute adjustment, however, we prefer to make the ultimate holding means for the gauges flexible to such an extent that each gauge will center itself upon the work piece. In order that wear of the angle calipering plates may be reduced to a minimum we prefer to embody them in separate detachable pieces made of some hard material, for example hardened tool steel, Stellite, tungsten carbide, tantalum carbide, or boron carbide. We prefer the latter substance as it is extremely hard and can be formed to the desired shape.

As three points determine a circle, the respective electrode calipering rods 102 and 102a will contact the work piece at some definite diameter thereof, depending upon their positions of adjustment. Furthermore, the gauging instrumentalities described are independent of expansion and contraction of supporting parts and independent of vibration or spring or other causes of maladjustment. A practical calipering device for a grinding machine ought to caliper to a size of the order of plus or minus .0002" or .0003". Therefore, the gauges of the invention which caliper by the geometric arrangement of instrumentalities rigidly clamped in position in a gauging head of small magnitude present marked advantages over certain previous types.

Considering now the adjustment of the electrode calipering rods 102 and 102a, which will be described for the calipering rod 102, and referring more particularly to Fig. 5, the member 106 which as described constitutes the base for the support of the slides 103 and 104 which support the angle calipering plates, has a horizontal bore 130 of considerably larger diameter than that of the calipering rod 102, and in which bore 130 the calipering rod 102 is located. The rod 102 is supported spaced from and insulated from the metal of the base 106 by means of an insulating bushing 131 at one end of the bore 130, the bore being slightly enlarged at that point, and by an insulating bushing 132 at the other end thereof, the bore 130 being also and substantially more enlarged at the other end. Between the insulating bushing 131 and the rod 102 is a metal supporting sleeve 133 to reduce wearing of the parts, and in the bushing 132 is a nut 134 through which passes a screw threaded portion 135 of the electrode 102. We provide a knurled insulating head 136 for the screw portion 135 and a check nut 137 with a knurled insulated head 138 in order to lock the rod 102 in any desired position of adjustment after it has been adjusted by turning the head 136.

As hereinafter more fully described in connection with the electrical actuating apparatus, the gauges of the invention operate by closing an electric circuit through contact with the work piece, and accordingly we provide a contactor 140 having a terminal 141, the contactor being mounted in an insulating holder 142 and spring pressed by means of a spring 143 into engagement with the rod 102. Thus the rod 102 is insulated from the machine but is connected in circuit through the terminal 141 as will be hereinafter described.

The invention contemplates certain instrumentalities and safeguards to avoid possible variations in accurate sizing due to arcing at the point of contact between the electrode rods 102 and 102a and also due to possible short circuiting through the coolant fluid, which is usually water. In the preferred embodiment of the invention we avoid arcing by utilizing very weak currents of low electromotive force, together with electronic amplifying apparatus to set into operation electrical instrumentalities of sufficient power to operate a heavy solenoid. With regard to the water, it may be mentioned that water not containing a substantial amount of ions, is not a good conductor of electricity. Consequently we propose to take advantage of the fact that a great increase of the current flowing through the electrodes 102 and 102a respectively will occur upon the contact thereof with the work piece. But furthermore we prefer to keep the stream of water away from the electrodes as much as possible, and to this end we have provided the wiping and sealing apparatus now to be described.

As shown in Fig. 2, we provide a rubber sleeve 144 fitting the electrode 102 and secured thereto by a ring 145, which sleeve, in contact with the work piece 32, operates as a cup to exclude water from the area enclosed by it. We further provide a slot 146 to drain away any moisture which gets past the cup 144. The electrode rod 102a has a similar member 144a attached to it, see Fig. 8.

Figure 8:
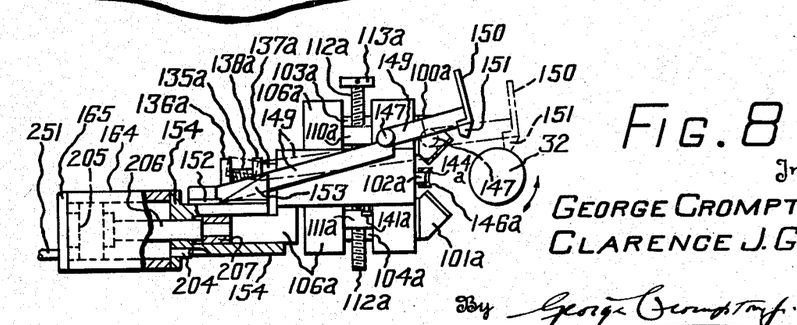
Fig. 8 is a side elevation of one calipering device showing different positions of the wiper.

Referring now to Figs. 8 and 9, mounted on the gauge supporting member 106a is a bracket 148 supporting a pin 147 upon which is pivotally mounted a lever 149. At that end of the lever 149 which is nearest to the work piece 32 is mounted a splash plate 150 on the bottom of which is a wiper member 151, preferably made of rubber or other flexible material. On the end of the lever 149 opposite the splash plate 150 we provide a projection 152 which is positioned to contact an inclined member 153 mounted on a cylinder head 154. When, as will be hereinafter described, the gauging member 106a moves forwardly relative to the cylinder head 154, the lever 149 is rocked by engagement of the projection 152 with the inclined member 153, and this not only moves the wiper 151 forwardly, but also swings it downwardly to engage the work piece 32. The plate 150 and wiper 151 are of sufficient width in the direction of the work piece axis to shield both rod terminals 102 and 102a.

Referring now to Figs. 3, 4 and 7, mounted upon the machine base 20 is a bracket 155 which has horizontal guideways 156. We provide a slide 157 mounted in the guideways 156, which slide 157 has an upwardly and rearwardly extending support 157a. Secured to the under side of the slide 157, as better shown in Fig. 3, is a nut 158. On the front of bracket 155 we provide a split journal 159, 160, supporting an adjusting screw 161 the screw threaded part of which is engaged by the nut 158, and axial motion of the screw shaft 161 relative to the bracket 155 is prevented by collars 162 and 162a. By turning the square end of the shaft 161, as with a wrench or the like, the slide 157 may be adjusted forwardly or rearwardly of the machine, and when the desired position of adjustment is achieved the parts may be securely clamped in position by means of a hand screw 163, see Figs. 3 and 7. Referring to Figs. 3 and 4, secured to the upper end of the upwardly extending portion 157a is a cylinder 164 the purpose of which will be presently explained. This cylinder has cylinder heads 154 and 165 on either end thereof.

Figure 11:
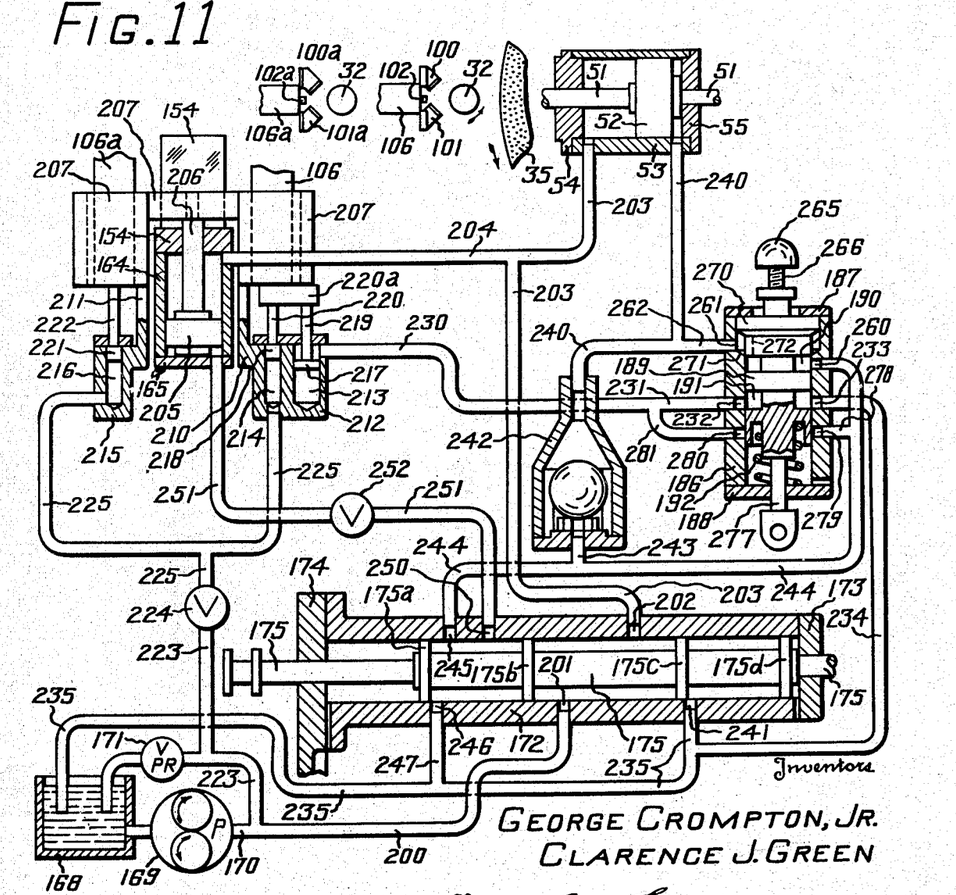
Fig. 11 is a hydraulic diagram showing the various parts in the position which they occupy when the machine is at rest, that is to say at the completion of a grinding operation and also prior to starting the machine in operation again.

Considering now the fluid pressure actuation of the cross slide 42, as well as other fluid pressure apparatus, and referring more particularly to Figs. 1 and 11, integrally formed with the base 20 is a fluid reservoir 168 for the collection and supply of oil or other fluid used in the fluid pressure operating apparatus. We provide a pump 169 which may be of any suitable type and driven from any source of power, not shown. A main pressure line 170 receives fluid from the pump 169, and shunted into the line 170 is a pressure relief valve 171 of any usual or desired type. We provide a valve casing 172 having an internal cylindrical bore, the ends of which are blocked by valve heads 173 and 174, the head 174 being in the form of a cover plate and the valve casing 172 being supported by it. We provide a valve rod 175 having spaced piston portions 175a, 175b, 175c, and 175d. The valve rod 175 extends through the cylinder heads 173 and 174 and is connected to a hand operating lever 176, as shown in Fig. 1. That part of the valve rod 175 which is outside of the valve head 173 has a plurality of notches 177, 178 and 179 for engagement by a detent 180 which is pressed into engagement with one of the notches by a spring 181 in a detent casing 182. Connected to the valve rod 175 at its rear end is a lever 183 pivotally mounted on a pin 184 supported by a bracket 185 projecting upwardly from the machine base 20, and this lever is automatically operated during a cycle of machine operation, as will be hereinafter described.

Still referring to Figs. 1 and 11, on the rear of the machine we provide another valve casing 186 having heads 187 and 188. In the casing 186, the bore of which is cylindrical, is a piston 189 having annular grooves 190 and 191. The piston 189 is urged upwardly by means of a spring 192 located between the bottom of the piston 189 and the head 188.

With the machine parts in the position shown in Fig. 1, that is to say with the grinding wheel 35 retracted from the work piece and with the calipering plates 100 and 100a and associated parts also withdrawn, the various instrumentalities of the fluid pressure actuating apparatus are in the respective positions thereof shown in Fig. 11. Fig. 1 also illustrates to a certain extent the positions of the various parts between grinding operations. Referring, therefore, particularly to Fig. 11, and also to Fig. 1, and describing a condition of static pressure as a flow of the pressure fluid through the channels through which it flows while it is actuating the parts, the pressure fluid flows from the pump 169 along piping 170 and 200 to an entrance port 201 in the cylinder 172 and thence by an exit port 202 along piping 203 to the front end of cylinder 53, thus holding the wheel slide retracted. There is a shunt pipe 204 connected to the pipe 203 which leads the fluid to the rear end of the cylinder 164 in which is located a piston 205 connected by means of a piston rod 206 to a cross head 207 in which are slidably supported the central gauging supporting members 106 and 106a, all as more clearly shown in Fig. 4. Thus with the piston 205 in the position shown in Fig. 11, the cross head 207 is forwardly of the machine, that is retracted with respect to the work piece, and both gauges are withdrawn.

Connected to the cross head 207 are forwardly extending portions 210 and 211, the portion 210 supporting a cylinder block 212 having formed therein cylinders 213 and 214, and the portion 211 supporting a cylinder block 215 having therein a cylindrical bore 216. In the cylinder 213 is a piston 217 and in the cylinder 214 is a piston 218 connected by piston rods 219 and 220 respectively to a cross piece 220a which is rigidly attached to the central gauging supporting member 106. In the cylinder 216 is a piston 221 connected by means of a piston rod 222 to the central gauging supporting member 106a. Referring to Fig. 11, pressure fluid may at all times flow from the main supply line 170 into a pipe 223 and through a restricted orifice valve 224 to piping 225 leading to the front end of each of the cylinders 214 and 216. Thus at all times the central gauging supporting members 106 and 106a are urged rearwardly of the machine, that is toward the work piece, but with the piston 205 in the position shown in Fig. 11, the gauges are nevertheless not in contact with the work. The fluid pressure means embodied in the cylinders 214 and 216 and pistons 218 and 221 are provided in order to effect a pressure contact of the gauges against the work piece and to allow the gauging instrumentalities to follow up the work as it is reduced in diameter. Furthermore, by means of the cylinder 213 and piston 217, we are enabled to withdraw the right-hand gauging instrumentalities prior to withdrawal of the left-hand gauging instrumentalities, by fluid pressure actuation, insomuch as the diameter of the piston 217 is greater than that of the piston 218. But with the parts in the condition shown in Fig. 11, the front end of cylinder 213 is opened to the exhaust as follows:

Piping 230 connects the front end of the cylinder 213 to piping 231 which leads to a port 232 which, with the wheel and gauges retracted, registers with groove 191 which, therefore, connects port 232 to a port 233 to which is connected piping 234 which connects to piping 235 which leads to the reservoir 168.

Figure 12:
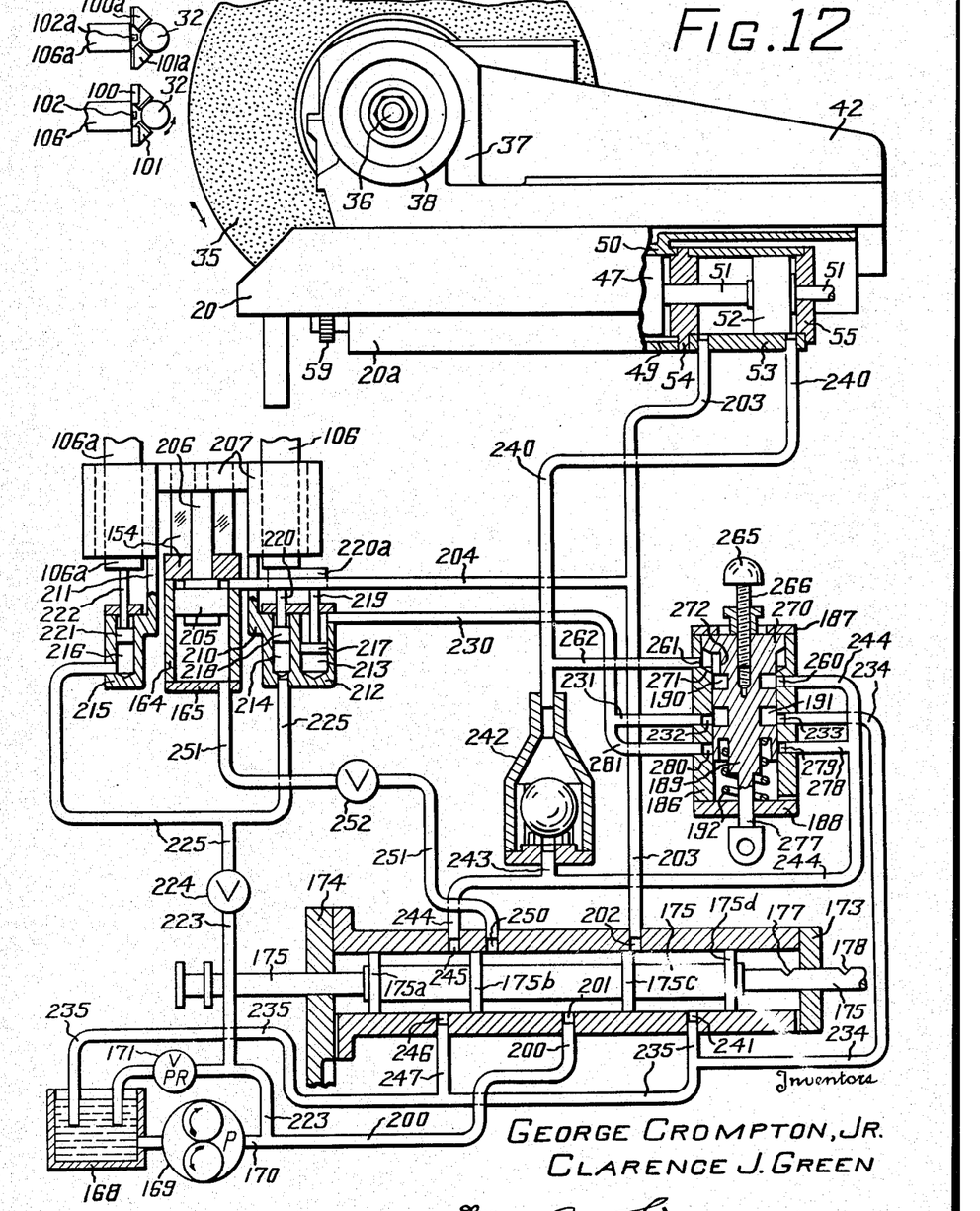
Fig. 12 is a hydraulic diagram showing the parts in the position which they occupy after the gauges have contacted the work piece and before the wheel has been advanced to grinding position.

Assuming that the operator has placed an unground work piece 32 between the centers 28 and 29 and caused the driving spindle and driving plate 30 to revolve, when he wishes to cause the grinding operation to commence he draws the lever 176 forwardly to the position where the detent 180 engages the notch 178, and this causes both sets of gauging instrumentalities to advance into contact with the work piece as follows:

Referring now to Fig. 12, the port 202 is now disconnected from the port 201 but the piping 240 which connects to the rear end of the cylinder 53 is not connected to the pressure side so there is no tendency for the wheel slide to move forward. Instead, both sides of the cylinder 53 are connected to the reservoir 168, the front side by way of piping 203, port 202, port 241 and piping 235, and the rear side by way of piping 240, check valve 242, piping 243, piping 244, port 245, port 246 and piping 247 to piping 235. The port 201 is, however, connected to port 250 which is connected by way of piping 251 through a restricted orifice valve 252 to the front end of the cylinder 164, which forces the piston 205 rearwardly. At the same time, pressure is admitted through piping 223, restricted orifice valve 224, and piping 225 to the front ends of the cylinders 214 and 216 so that, as the cross head 207 and, therefore, the portions 210 and 211 and the cylinder blocks 212 and 215 are moved toward the work pieces, the central gauging supporting members 106 and 106a are likewise carried forward, but as soon as the respective gauges contact the work piece they and their supporting members 106 and 106a may stop while the rest of the parts move forwardly responsive to movement of the piston 205.

Figure 13:
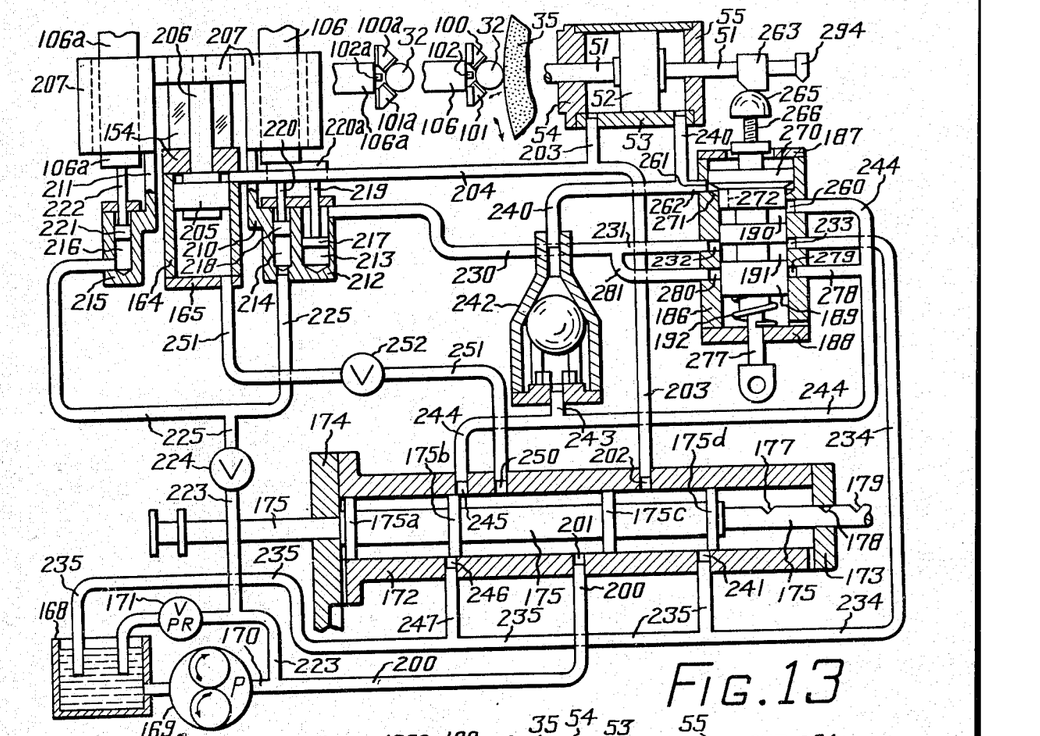
Fig. 13 is a hydraulic diagram showing the parts in the position which they occupy as the grinding operation starts.

It is desirable that the operator be able to move the gauges into position without moving the grinding wheel, in order to set up the machine, including the adjustment of the gauges and for other purposes, and in the machine of the invention the gauges may be moved back and forth prior to the commencement of grinding any number of times by moving the hand lever 176 between its full line position, Fig. 1, and the intermediate dotted line position there shown. Whenever the operator wishes to cause the grinding operation to commence, whether the gauges have been previously advanced or not, he moves the lever 176 to the left-hand dotted line position, Fig. 1, thus moving the notch 179 under the detent 180, and this brings the grinding wheel 35 against the work piece 32 to start the grinding operation, the pressure fluid apparatus having moved and being then and thereafter until further actuation in the condition shown in Fig. 13, as follows:

Fluid is still admitted to piping 251 and fluid is still admitted to piping 225, thus the condition of the gauging instrumentalities remains the same. But fluid is now admitted to the port 245 and, by way of piping 244, to a port 260. Opposite to the port 260 is a port 261 connecting by way of piping 262 to the piping 240 which, as will be remembered, connects to the far end of the cylinder 53. Immediately the operator has moved the lever 176 to the most forward position, the piston 189 is in the position shown in Fig. 12, and the groove 190 connects the ports 260 and 261 to allow the fluid to flow, and furthermore to allow an unrestricted flow. Referring now to Figs. 1 and 13, the piston rod 51 extends rearwardly of the machine and has located thereon a cam 263 and a trip block 294, and the cam 263 is preferably adjustable upon the piston rod 51. In the path of the cam 263 is a knob 265 on the end of a screw 266 which is adjustably mounted on the upper end of the piston 189; downward movement of the knob 265 moves the piston 189 to the position shown in Fig. 13, or other desired adjusted position, to restrict the flow of fluid from port 260 to port 261 and therefore cause a slow or feeding movement of the cross slide to effect the desired grinding operation. The cam 263 will ordinarily be adjusted so that the cross slide is slowed down just prior to actual contact between the grinding wheel and the work piece. By the provision of this mechanism we are enabled to avoid loss of time in bringing the grinding wheel into contact with the work piece, and at the same time we procure the desired slow movement of the cross slide for the preliminary feeding operation to reduce the work piece in diameter.

Considering now more particularly the construction of the valve 189, it includes a poppet valve portion 270 and the valve casing 186 has a seat 271 for the portion 270 so that, when the valve 189 is moved to its lowermost position the ports 260 and 261 are separated by a fluid pressure seal which permits no fluid to pass through; with the parts in the position of Fig. 13, however, fluid can flow slowly through a narrow slot 272 in a cylindrical portion of the member 189 just below the poppet valve 270.

Figure 14:
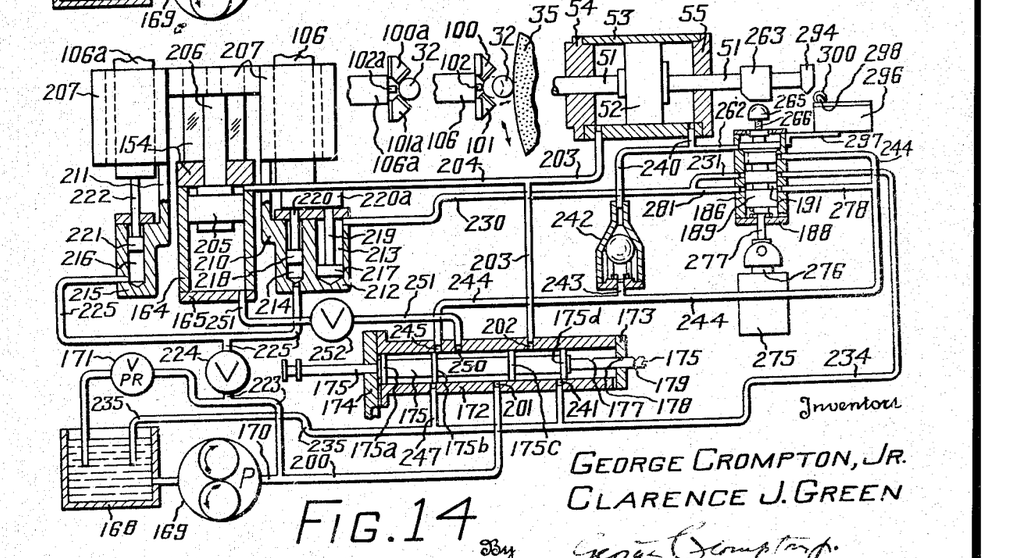
Fig. 14 is a similar diagram showing the condition after the first sizing gauge has operated, and prior to operation of the instrumentalities responsive to the second gauge.

The grinding operation proceeds by the slow entrance of fluid into the rear end of the cylinder 53 causing the grinding wheel to approach the work piece until such time as the work piece is reduced sufficiently in diameter to cause the right-hand gauge electrode 102 to contact the work piece 32; whereupon a very minute current flows through the electrode 102 which, being duly amplified, causes energization by a strong current of a solenoid 275 which draws downwardly a solenoid core 276 which is attached to a rod 277 integral with the valve member 189, thus moving the valve member 189 downwardly, and following this occurrence the pressure fluid instrumentalities are in the condition shown in Fig. 14, as follows:

Pressure is still admitted through the pipe 225 as already explained, but pressure is admitted to the rear end of the cylinder bore 213 thus moving the piston 217 forwardly, which moves the central gauging supporting member 106 to the front of the machine, withdrawing the right-hand set of gauging instrumentalities from the work piece. This action can take place by reason of the differential in sizes of the pistons 217 and 218. The pressure fluid reaches the rear of the cylinder bore 213 by way of piping 170, piping 200, port 201, port 245, piping 244, shunt piping 278, port 279, groove 191, port 280, shunt piping 281 and the piping 230. It will be noted from inspection of Fig. 14 that the valve 175 is in the same position it was while the grinding wheel was moving toward the work piece.

The grinding wheel is now prevented from further approaching the work piece, but grinding continues by reason of the pressure set up in the machine and such grinding is usually termed "sparking out". The second gauge point 102a is set so that when the work piece is brought to the desired finished size, it will contact therewith. During the finish grinding, while the final and finishing cuts are being taken on the work piece, this being a gradually dying-out grinding operation, the right-hand gauging instrumentalities including the electrode 102 are removed from the work piece. This avoids undue wear of the gauging apparatus. When the electrode 102a contacts with the work piece, a very weak current flows therethrough which is amplified and a current backed by a strong electromotive force energizes a solenoid 282 which has a core 283 which is connected by means of a link 284 to the lever 183. Movement of the solenoid core 283 swings the lever 183 to the position shown in Fig. 1, thus moving the valve 175 back to its original position, causing the piston 205 to move forwardly and retracting the entire gauging head, which has the effect of moving the second gauge away from the work piece; at the same time fluid is admitted to the front of the piston 52 retracting the grinding wheel 35 from the work piece.

Considering still further the fluid pressure apparatus, the check valve 242 is provided so that, during the normal grinding operation, prior to contact of either gauge electrode, the fluid will be forced to go through the restricted passage 260 rather than by way of piping 240; on the other hand, when the wheel slide is moved away from the work piece, it is desired that the movement be a rapid one, unimpeded by any resistance at the start thereof, and accordingly check valve 242 and piping 240 is a shunt between the rear side of the cylinder 53 and the piping 244 and thus to the port 245 which, when the valve 175 is in its initial position, is connected to the reservoir 168. The valve 252 is an adjustable valve and therefore, if desired, the approach of the gauges toward the work piece may be at a very slow rate, and at the same time the operator may move the lever 176 from the upright position to the extreme forward position with a single motion; under such circumstances the grinding wheel 35 will contact the work piece before the gauges contact it, and it is desired to be able to control the machine this way for grinding rough work pieces that have not been previously ground or have not even been previously machined, in order to avoid undue wear of the gauging instrumentalities by work pieces having an excessive amount of scale or other foreign hard matter thereon, or which are unduly rough or irregular.

Considering now the manner and means by which contact of the electrode 102 or the electrode 102a sets in operation the various instrumentalities described by energizing respectively the solenoids 275 and 282, and referring more particularly to the diagrammatic view of Fig. 10, with reference to Fig. 1 for certain mechanical instrumentalities, the right-hand end of piston rod 51 has thereon a trip block 294 and below it is a switch box 296 adjustably supported by means of a bracket 297 attached to the valve casing 186. In the switch box 296 is a switch lever 298 mounted on a trunnion pin 299 and having on its upper and left-hand end a roller 300. A spring 301 urges the lever 298 in a clockwise direction, while a block 302 acts as a stop to inhibit movement beyond the limit shown in Figs. 1 and 10. The right-hand end of lever 298 carries an insulated contact strip 303 adapted to contact a strip 304. Except when the roller 300 is depressed by the trip block 294, the circuit is open between contact strips 303 and 304, but whenever the trip block 294 rides over the roller, the circuit is closed.

Figure 10:
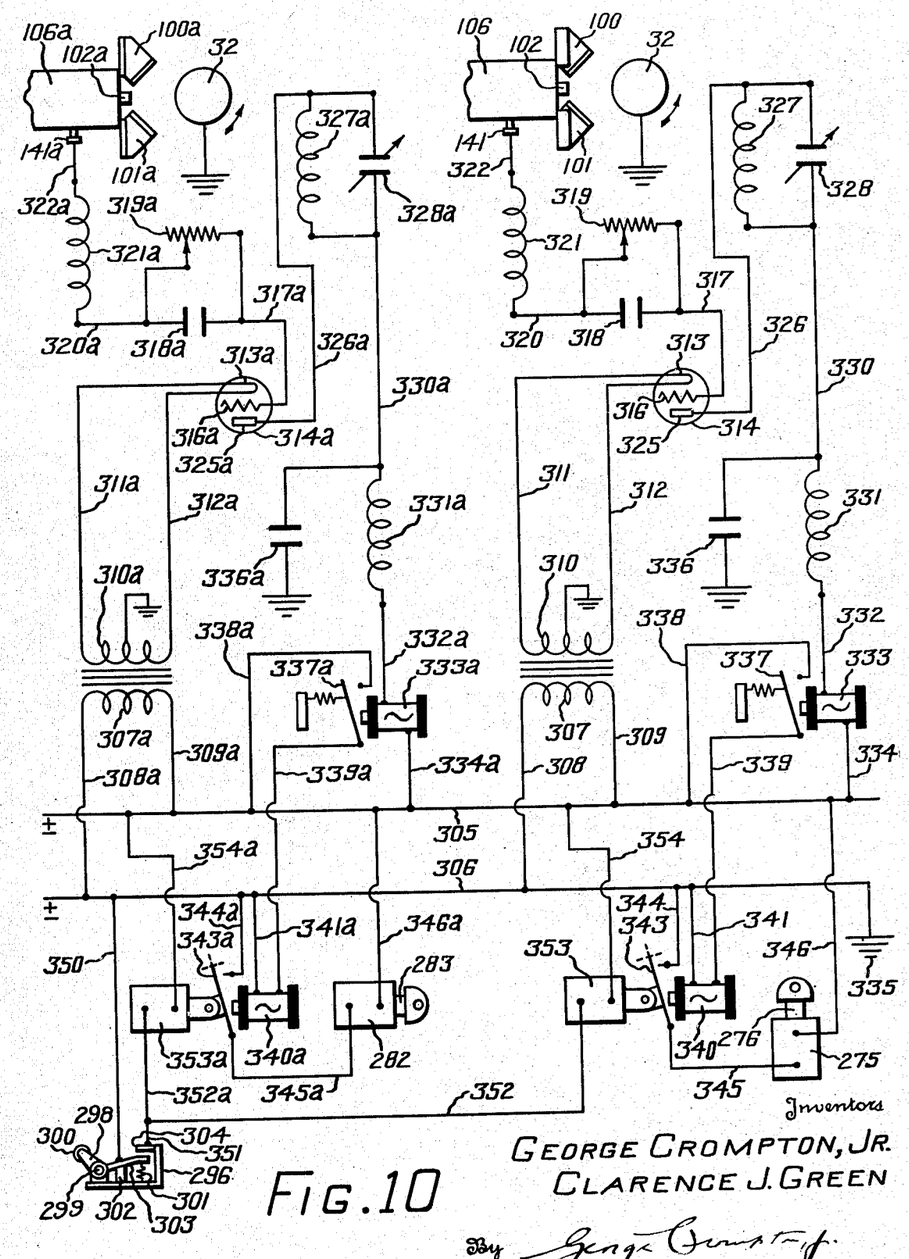
Fig. 10 is an electrical diagram.

We provide any suitable source of alternating current, for example 110 volts, 60 cycles, represented on Fig. 10 by the main power lines 305, 306. Connected across these lines 305 and 306 is a transformer primary 307, by means of conductors 308 and 309. Similarly, a transformer primary 307a is connected by conductors 308a and 309a to the power lines 305 and 306.

Transformer secondaries 310 and 310a are connected by conductors 311, 312, and 311a and 312a respectively to filaments 313 and 313a respectively of triode tubes 314 and 314a. The mid point of the secondaries 310 and 310a are grounded as shown.

The grids 316 and 316a of the tubes are connected by conductors 317 and 317a to condensers 318 and 318a and also non-inductive rheostats 319 and 319a in parallel. These instrumentalities are connected by conductors 320 and 320a to inductances 321 and 321a which are connected by conductors 322 and 322a to the electrodes 102 and 102a by way of the terminals 141 and 141a, as already described. Each work piece 32 is, of course, grounded by reason of the fact that it is mounted between the centers 28 and 29. It will now be seen that when an electrode, for example the electrode 102, touches the work piece 32, the grid 316 is grounded through the rheostat 319 and inductance 321, and insomuch as the mid point of the transformer 310 is grounded, the triode tube oscillates. In the tube 314 is a plate 325, and in the tube 314a is a plate 325a. These plates are respectively connected by conductors 326 and 326a to inductances and variable condensers in parallel respectively 327, 327a, 328 and 328a which are connected by conductors 330 and 330a to radio frequency choke coils 331 and 331a and thence by way of conductors 332 and 332a to sensitive relay coils 333 and 333a. The other side of the relay coils are connected by conductors 334 and 334a to the line 305. Main power line 306 is grounded, as shown, at 335. The reason for the inductance 327 and variable condenser 328 is to tune the plate circuit into resonance with the grid circuit, thereby permitting the tube to oscillate. The amount of current flowing through the electrode 102 can be adjusted by the rheostat 319. The foregoing characteristics are also true of the inductance 327a, variable condenser 328a and the rheostat 319a, respectively. For each circuit we provide a grounded by-pass condenser 336 and 336a, respectively.

The sensitive relays 333 and 333a respectively have relay switches 337 and 337a, one side connected by conductors 338 and 338a to the power line 305 and the other side connected by conductors 339 and 339a to relays 340 and 340a. Conductors 341 and 341a connect the other side of these relay coils to the power line 306. Thus when either one of the sensitive relays is energized, a power circuit through the relay controlled by it is closed, and this closes one or the other of knife switches 343 and 343a. The knife switch 343 controls operation of solenoid 275, while the knife switch 343a controls operation of the solenoid 282. One end of each of these knife switches is connected by conductors 344 and 344a respectively to the power line 306, and the other ends of the knife switches 343 and 343a are connected by conductors 345 and 345a respectively to the solenoids 275 and 282, the other sides of the solenoid coils being connected by means of conductors 346 and 346a respectively to the line 305.

Thus when the grinding operation has proceeded far enough to cause the electrode 102 to contact the work piece 32, the tube 314 draws current which energizes the sensitive relay 333 which causes energization of the relay 340 which closes a knife switch energizing the solenoid 275. Furthermore, when the work piece is finished and the electrode 102a contacts the work piece, the tube 314a draws current which energizes the sensitive relay 333a, this causing energization of the relay 340a which closes the knife switch 343a and operates the solenoid 282.

When the grinding wheel is approaching the work piece, but not actually in contact with it, and also when the grinding wheel is receding from the work piece, the trip block 294 strikes the roller 300 and this closes the circuit between the contact strips 303 and 304 momentarily. The strip 303 is connected by a conductor 350 to the power line 306, while the strip 304 is connected by a conductor 351 to a pair of conductors 352 and 352a leading to solenoids 353 and 353a, the other ends of the coils of which are connected by conductors 354 and 354a to the power lines 305. These solenoids 353 and 353a are connected to the knife switches 343 and 343a so that when the solenoids are energized the switches will be opened. Thus all switches are opened at the start and before the start of a grinding operation. By reason of the provision of the knife switch 343, the solenoid 275 remains energized even after the electrode 102 has been removed from the work piece by the fluid pressure withdrawal thereof which was previously described. Furthermore, even momentary closing of the sensitive relay control contact 337a causes closing of the knife switch 343a and so the solenoid 282 is operated, if at all, by a steady and powerful current. The same is true of the solenoid 275. But whenever the grinding wheel runs away from the work piece by retraction of the cross feed slide, which is bound to happen when the solenoid 282 is energized, both knife switches are opened by the automatic means herein described.

A particular feature of the invention resides in the fact that the metallic contact electrodes are in contact with the work piece, during each particular grinding operation, for an instant only, and consequently wear thereof is minimized. Another feature of the invention resides in the fact that the gauging apparatus is not dependent upon the relation of some machine part connected through the machine base and carriages and tables to the work piece, but a true gauging operation upon the work piece itself is effected. nevertheless the only elements which continuously contact the work piece, viz. the plates 100, 101, 109a, 101a, do not transmit electricity and may be made of any hard and wear resistant substance as already stated. By reason of the provision of electronic amplifying apparatus a current so small that it will not arc is all that is carried by the electrodes, and nevertheless this is amplified and operates relays to operate the machine, controlling solenoids with a full strength and dependable current. By reason of the provision of the rheostats 319 and sensitive relays 333, the apparatus can be adjusted so that it will not be operated by whatever current leaks through the grinding water but only when actual metal contact is made.

Another feature of the invention resides in the fact that there are no moving parts in the calipering head which move during the calipering operation. The calipering head as a whole is urged towards the work piece and, while it is gauging, each Y-gauge mechanism is maintained against the work piece. While both the head as a whole and each gauge separately are individually movable, nevertheless the relative position of the Y-gauge parts remains fixed during a given machine operation. Furthermore, means for rigidly attaching and securely anchoring the several parts of each gauge mechanism has been shown and described. The result is that variations in gauging due to stresses within the gauging parts are practically eliminated.

Another feature of the invention resides in the means for ready adjustment of the calipering head toward and from the machine centers 28 and 29. This is a feature of practical importance insomuch as it permits the calipering device to be set up for many different sizes of work pieces. This feature is, as already described, independent of the automatic advance and withdrawal of the calipering head by fluid pressure means.

Along with the feature just mentioned is the adjustability of each Y-gauge. This permits each gauge to be individually adjusted for the sizing of different work pieces. Nevertheless, by means of the wedge clamps, the parts of each gauge can be so firmly secured in position as to eliminate variation in the ultimate size of a work piece by slipping of the parts at the adjustable connection.

Still another feature of the invention resides in the fact that the central plane of the electrodes 102 and 102a does not have to be in the horizontal plane of the centers 28 and 29 to an accuracy of more than .002" or .003". It is theoretically possible but practically very difficult to build a machine tool with separate parts so closely aligned and without the possibility of misalignment. But the bracket 157a is more or less resilient owing to its length and consequently the gauges are self-adjusting upon the work piece within the limitations of a few thousandths of an inch and by reason of the pressure exerted upon them. The bracket 157a is preferably made of steel or malleable iron so as to allow it to be slightly bent to bring the central plane of the gauging heads to that position where they will most readily adjust themselves upon the work pieces.

Another feature of the invention lies in the fact that it is possible to bring the wheel into contact with the work piece before the gauges and, on the other hand, it is possible to bring the gauges into contact with the work piece before the wheel. Furthermore, by shifting the lever 176, the gauges can be moved against and away from the work piece as many times as desired without causing engagement of the work piece by the grinding wheel. This feature is of importance in setting up the machine for a certain size of work piece.

Still another feature of the invention resides in the use of the flat contact plates 100 and 101 which may be made of boron carbide or other hard material and which, therefore, will not scratch the work piece. These plates 100 and 101 and the corresponding plates 100a and 101a act as steadyrests since they are urged against the work piece by fluid under pressure. Thus the apparatus is not only a gauging apparatus but also acts as a steadyrest.

The automatic advance or withdrawal of the gauges separately and together is a feature contributing to make the machine automatic and, furthermore, wear upon the electrodes is reduced to an absolute minimum by reason of the fact that the barest contact of each with the work piece is all that takes place during the grinding and gauging of that work piece.

Still another feature of the invention resides in the organization of the gauging apparatus whereby the operator is allowed full and free access to the work piece to inspect the same and, moreover, the operator is not interfered with in the loading of the machine. In the embodiment of the invention described there are practically no overhead parts.

It has already been mentioned that the gauging apparatus also acts as a steadyrest. Its action as a steadyrest is enhanced by reason of the fact that it is always located opposite the wheel. Furthermore, this permits the use of the apparatus described in connection with a grinding operation in which a relative traverse between wheel and work piece is employed. If the work piece is a uni-diameter shaft, relative reciprocation between the work piece and the gauges is entirely practical in accordance with the disclosure of the present invention.

Figure 15:
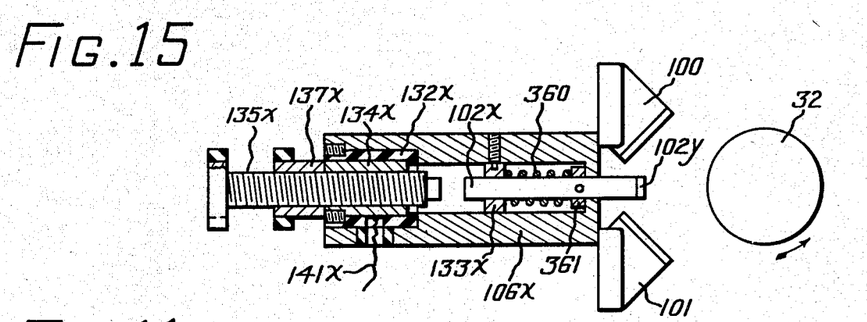
Fig. 15 is a view similar to Fig. 5, illustrating a modification of the invention.

Referring now to Fig. 15, we have therein disclosed a modification of the invention according to which some of the features of advantage already mentioned though not all thereof are achieved. The modified apparatus may be employed especially in cases where dry grinding is practiced and in which the work piece is magnetic so that chips would be apt to short circuit prematurely the gauging apparatus already described. Referring now to Fig. 15, we provide an adjustable screw threaded plug 135x in a sleeve 134x which is insulated by insulation 132x, the plug being held in desired position of adjustment by nut 137x. Terminal wire 141x is insulated from the machine and connects to the sleeve 134x and this terminal wire 141x is connected into one of the circuits already described as was either of the terminals 141 or 141a. In place of the electrodes 102 and 102a we provide a contact rod 102x having a tip of hard and insulated material 102y, which material may be boron carbide. This rod 102x is mounted between a collar 133x and the front of the main supporting sleeve 106x. A spring 360 acting against a collar 361 and reacting against the collar 133x urges the rod 102x toward the work piece. The tip 102y, therefore, continuously contacts the work piece, and when the work piece comes to the desired size, whether for cessation of cross feed advance or for wheel withdrawal or for other purposes, the rod 102x strikes the end of the plug 135x, and accordingly the current through terminal wire 141x is grounded. In this case the actual contact is made in a closed box amply insulated.

Certain combinations herein described are the separate invention of Franklin E. Johnson and are claimed in a copending application Serial No. 105,157 filed October 12, 1936, but the gauge per se and the general machine combinations as hereinafter claimed constitute our invention.

It will thus be seen that there has been provided by this invention an apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:—

1. In a grinding machine, a grinding wheel, means to support a work piece for rotation, feeding means to feed the work piece and the grinding wheel one with relation to the other, an electrode, means urging the electrode towards the work piece, means contacting the work piece to limit movement of the electrode, electrical means controlling the feeding means, and an electrical circuit governing said electrical means including in said circuit the work piece and the electrode and which circuit is complete when the work piece and the electrode are in contact.

2. In apparatus as claimed in claim 1, the combination with the parts and features therein specified, of electronic amplifying apparatus to produce an amplified electric current when the work piece and the electrode are in contact, said amplified current operating the electrical means that controls the feeding means.

3. In a grinding machine, a grinding wheel, means to mount a work piece for rotation, a cross slide to procure a cutting feed between the wheel and work piece, a Y-gauge including a central electrode, an electrical device to alter the feed, a relay, a source of electrical energy, and amplifying means connected to the electrode and the relay to cause the source of energy to actuate the electrical device to alter the cross feed.

4. In a grinding machine, a grinding wheel, means for supporting a work piece, an electrode, means to move the electrode toward the work piece, means limiting such movement, an electrical device controlling the grinding operation, an electric circuit connected to the electrode and the work piece and further connected to a triode tube amplifying device, and a connection between the triode tube amplifying device and the electrical device whereby the latter is operated by the former.

5. In a grinding machine, a grinding wheel, work centers to hold a shaft or the like to be ground, a gauging head, a pair of gauging plates on said head, adjustment means for one of said gauging plates, a central electrode, an electrically operated device, an electric circuit including the electrode and the work piece, and relay circuits governed by the condition of said circuit to operate said device.

6. In a grinding machine, a grinding wheel, means supporting a work piece in position to be operated upon by the grinding wheel, a pair of Y-gauges, a slide for said gauges, and means urging the gauges towards the work piece on said slide.

7. In a grinding machine, a grinding wheel, means to hold a round work piece for rotation and for operatioin upon by said grinding wheel, a Y-gauge with an adjustable side piece and a central electrode, electronic amplifying means the grid of which is connected to said electrode, and relay apparatus for operating an instrumentality.

8. In a grinding machine, a grinding wheel, means supporting a work piece for rotation and in position to be operated upon by the grinding wheel, a Y-gauge including an electrode, a triode tube including three elements, a filament, plate and grid, a connection between the grid and the electrode, and a relay operated by one of the other elements of the triode tube.

9. In a grinding machine, a grinding wheel, means supporting a work piece for rotation and in position to be operated upon by the grinding wheel, a Y-gauge including an electrode, a triode tube including three elements, a filament, plate and grid, a connection between the grid and the electrode, a relay operated by one of the other elements of the triode tube, and a second relay.

10. In a grinding machine, means supporting a round work piece for operation by a grinding wheel, a Y-gauge with a central electrode, means resiliently maintaining said Y-gauge in contact with a work piece, means shielding the electrode from grinding fluid, an electrical operating device, and amplifying means energizing said device when said electrode contacts the work piece.

11. In a grinding machine, means supporting a round work piece for rotation, a Y-gauge, electrode contact means carried by the gauge to close a circuit when the work piece reaches a certain minimum diameter, an electric operating device, and amplifying means set in operation by the closing of the circuit to operate the electric operating device.

12. In a grinding machine, means supporting a round work piece for rotation, a Y-gauge, means resiliently urging said Y-gauge against the work piece, an electric contact device carried by the Y-gauge to close a circuit when the work piece reaches a minimum diameter, electric amplifying means including a triode tube, and means set in operation by said amplifying means when the circuit is closed to withdraw the gauge from the work piece.

13. In a grinding machine, a grinding wheel, means for supporting a round work piece for rotation and in position to be operated upon by said grinding wheel, a cross feed for relative movement of said grinding wheel and work piece, a Y-gauge, means resiliently urging said Y-gauge against the work piece, an electric contact device carried by the Y-gauge to close the circuit when the work piece reaches a minimum diameter, electric amplifying means including a triode tube, and means set in operation by said amplifying means when the circuit is closed to alter the cross feed.

14. In a grinding machine, a grinding wheel, means for supporting a round work piece for rotation and in position to be operated upon by said grinding wheel, a pair of steadyrest plates, means urging said steadyrest plates against the work piece, and an element structurally connected to both of said plates in definite geometrical relation thereto whereby it will contact the work piece only when the work piece has been reduced to a given diameter thereby gauging the work piece by the tangency of the plates and the contact of the element.

15. In a machine tool, means supporting a work piece, means supporting an insulated electrode in position conditionally to contact the work piece depending upon the size thereof, means to cut the work piece to change its size, a triode tube having three elements, a filament, a plate and a grid, electrical connections between the electrode and the grid, a sensitive relay, electrical connections between one of the other elements in the tube and the sensitive relay, and means controlled by the sensitive relay for altering the cutting operation.

16. An automatic gauging and controlling apparatus for machine tools for controlling the machine responsive to the gauging of an external cylindrical surface of the work piece which the machine tool is reducing in diameter, comprising a work contacting element, means urging said element against the work piece in a path between a tangency and a radius, a second contacting element rigidly attached to said first element whereby said second element can touch the work piece only when the work piece has been reduced to a given diameter, an electric potential, conductors connected to the second element and to the work piece and to said electric potential, and electric instrumentalities energized when current flows through said conductors.

17. An automatic gauging and controlling apparatus for machine tools for controlling the machine responsive to the gauging of an external cylindrical surface of the work piece which the machine tool is reducing in diameter, comprising a pair of work contacting elements, means urging said elements against the work piece, one of them in a path between a tangency and a radius, a third contacting element rigidly attached to both of said elements whereby said third element can touch the work piece only when the work piece has been reduced to a given diameter, an electric potential, conductors connected to said third element and to the work piece and to the potential, and electric instrumentalities energized when current flows through said conductors.

18. In a grinding machine, means supporting a round work piece for rotation, a Y-gauge for gauging the external diameter of the work piece and having two work contacting surfaces, an electrode rigidly connected to the Y-gauge and located in the crotch of the Y, a source of electric potential, conductors connected to said source and to the electrode and to the work piece, and electrical apparatus energized when current flows through said conductors to control a grinding operation.

GEORGE CROMPTON, Jr.
CLARENCE J. GREEN.